A. C. HOOF.
STEEL CUSHION WHEEL.
APPLICATION FILED JUNE 26, 1919.
1,422,976.
Patented July 18, 1922.
2 SHEETS—SHEET 2.
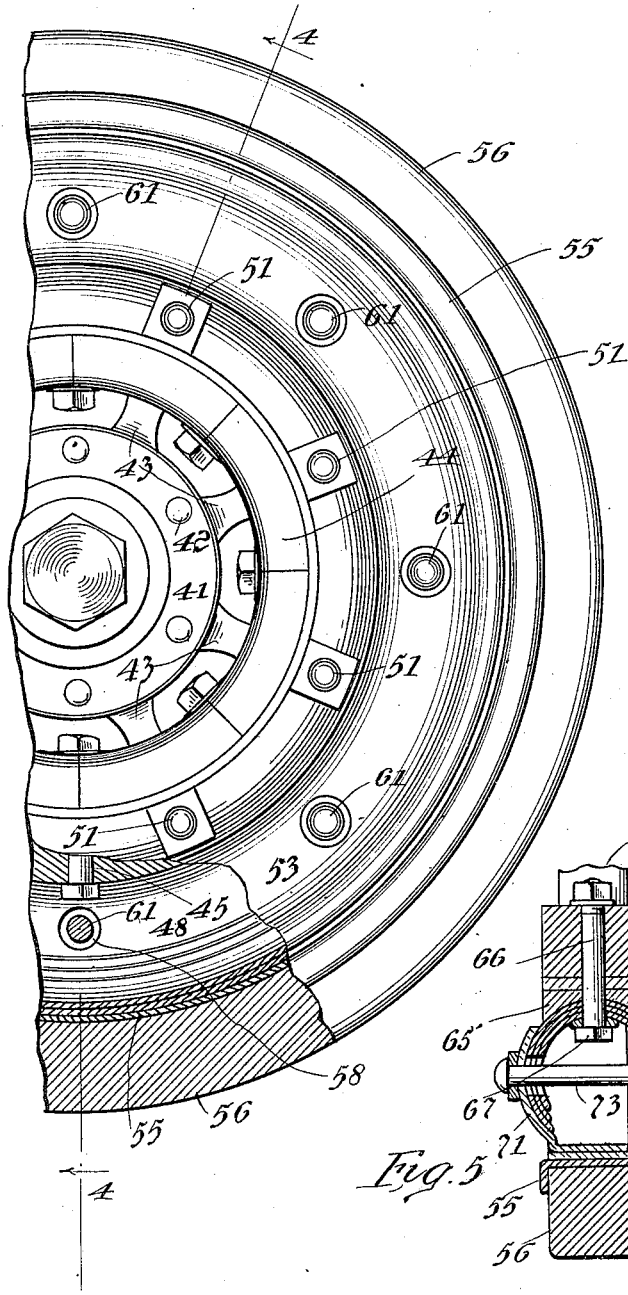
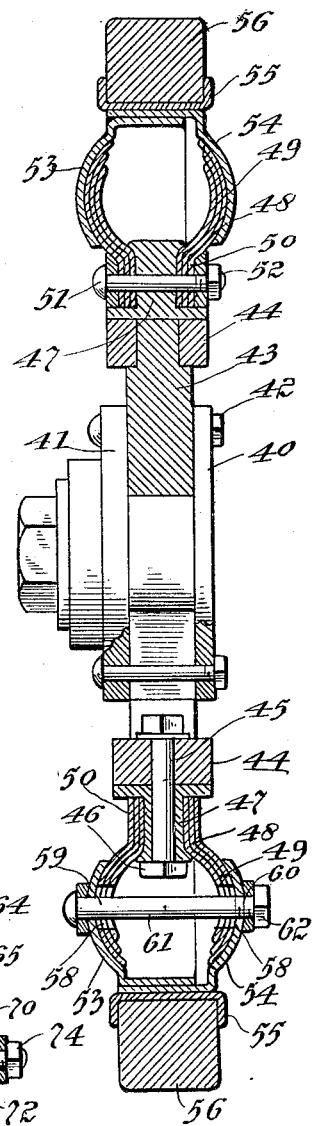
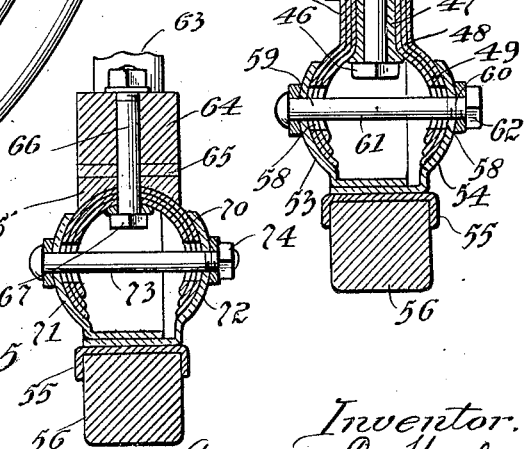
Inventor.
Addison C. Hoof
By Jones, Addington, Ames & Seibold Attys.

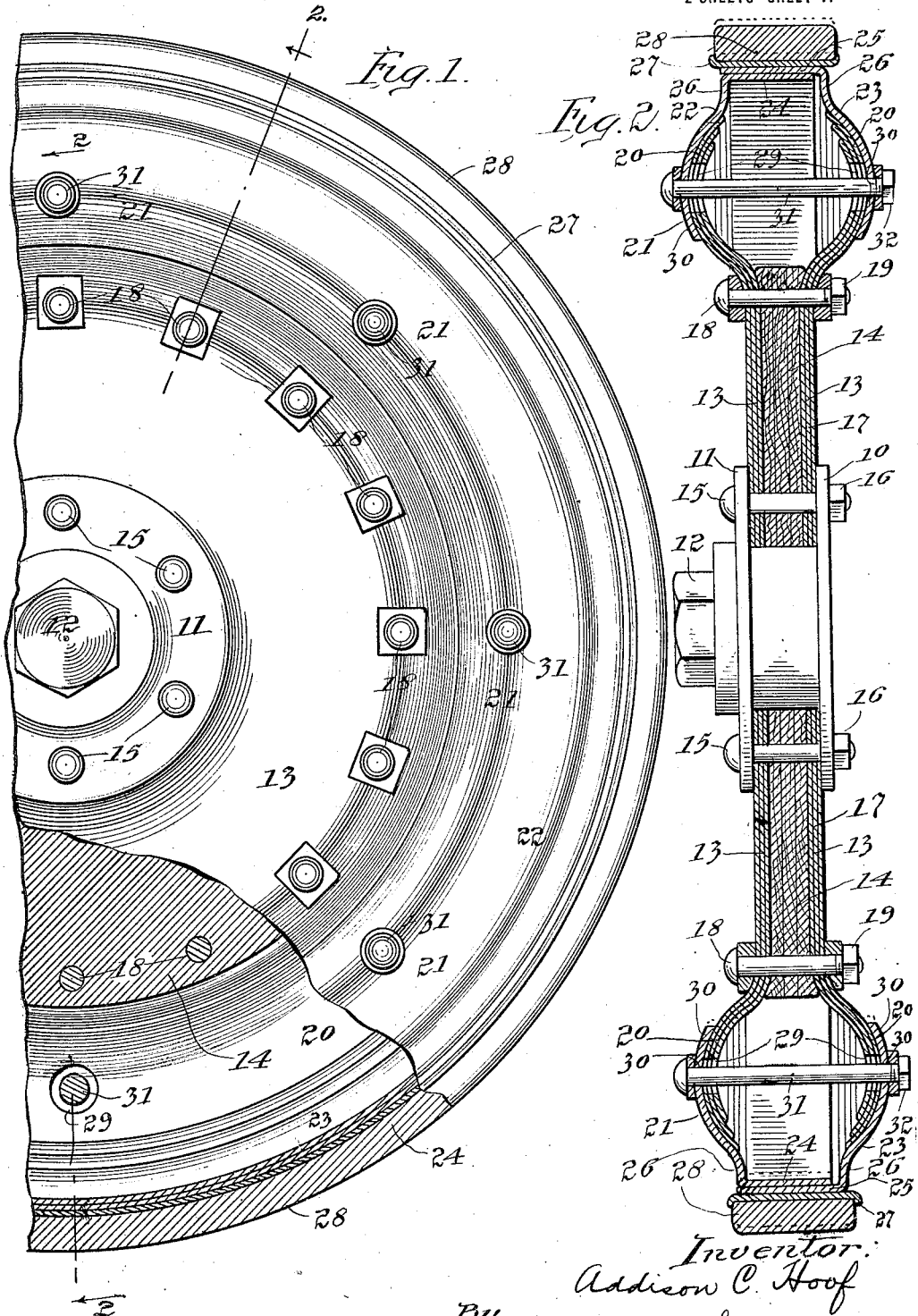

UNITED STATES PATENT OFFICE.

ADDISON C. HOOF, OF CHICAGO, ILLINOIS.

STEEL-CUSHION WHEEL.

1,422,976.  Specification of Letters Patent.  Patented July 18, 1922.

Application filed June 26, 1919. Serial No. 306,772.

*To all whom it may concern:*

Be it known that I, ADDISON C. HOOF, a citizen of the United States, residing at Chicago, in the county of Cook and State of Illinois, have invented new and useful Improvements in Steel-Cushion Wheels, of which the following is a full, clear, concise, and exact description, reference being had to the accompanying drawing forming a part of this specification.

This invention relates to steel cushion wheels and more particularly to an improved form of wheel in which resilient metallic plates, preferably composed of steel spring, are utilized to absorb the shocks and vibrations due to irregularities and obstructions in the road.

One of the objects in this invention resides in the production of a wheel in which the shock and vibration absorbing means is composed of metallic plates or springs of improved construction and assembly, whereby their resilience will act to absorb road vibrations and shocks as well, if not better, than these shocks and vibrations are absorbed by the common pneumatic tire.

Another object consists in the production of an improved wheel of this type composed of annular metallic spring plates normally held in compression, the resilience of said plates serving to absorb the shocks and vibrations due to road irregularities.

A further object of the invention consists in the production of an improved wheel which is simple in construction and in which resilient vibration and shock absorbing springs of improved form are assembled with the tire tread in such a manner as to permit vertical movement of said tread, said movement being absorbed by the said springs and their cooperating parts.

Other objects of the invention will become apparent from the following description, the accompanying illustrations, and the appended claims.

For the purposes of description, several embodiments of the invention have been illustrated in the accompanying drawings in which—
Fig. 1 is a front elevation of a portion of an assembled wheel with a part of the outer casing broken away;

Fig. 2 is a section of the wheel taken on the plane indicated by the line 2—2 of Fig. 1 looking in the direction of the arrows;

Fig. 3 is a front elevation of a portion of the assembled wheel with a part of the outer casing broken away of a second embodiment of the invention;

Fig. 4 is a section of the wheel illustrated in Fig. 3 taken on the plane indicated by the line 4—4 of Fig. 3 looking in the direction of the arrows; and Fig. 5 is a section through the shock absorbing means of another embodiment of this invention.

The preferred form of the invention is illustrated in Figs. 1 and 2 and consists of a wheel supporting means, preferably composed of the steel flanges 10 and 11, suitably apertured to receive the axle on which the wheel is rotatably secured by means of a securing nut such as 12. Positioned between the plates 10 and 11, and next adjacent to each plate, are a plurality of annular spring plates such as 13, these plates being held apart and separated in any suitable manner, preferably by a wooden separating block 14. This block 14 is preferably laminated. The plates 13 and block 14 are secured to the steel flanges 10 and 11 by means of bolts such as 15 and their cooperating nuts 16. The annular plates 13 are preferably constructed with a straight portion or stem 17 which rests against the wooden block 14, the outer end of the straight stem portion being held together in assembled relation with the block 14 by means of bolts such as 18 and their cooperating nuts 19. The portions of the spring plates 13 extending outwardly from the end of the straight section 17 are bowed, as indicated at 20. These bowed portions of the spring plates 13 mounted on either side of the block 14 extend laterally outward in opposite directions, as clearly indicated in Fig. 2 forming a curved spring projection extending around the entire periphery of the wheel.

The annular spring plates 13 secured to the flanges 10 and 11, and separated by the block 14, may obviously be arranged and assembled in any desired manner, depending upon the conditions under which the wheel is to be used, that is, depending upon the weight of the car which the wheel is to support and the character of vibrations and shocks which it is desired that the tire shall absorb. It will consequently be evident that depending upon conditions of service, the number of springs associated with each of the flanges 10 and 11, and the wooden block 14 may readily vary. Thus for example, but a single annular spring plate may be assembled on either side of the block 14, and secured to the steel plates 10 and 11, or a plurality of said plates may be assembled on either side of the block 14, the number of these plates being either greater or less than the three shown in the drawing Fig. 2.

The bowed ends 20 of the spring plates 13 are enclosed in a two-part housing 21 composed of the parts or plates 22 and 23. Each of these plates 22 and 23 is annular in shape, the portion of said plates enclosing the bowed ends 20 of the plates 13 being shaped to conform to the bowed ends of said springs. The lower portions of these plates 22 and 23 are fitted with the parts 24 and 25 turned at right angles to the short straight portion 26 extending forwardly from the bowed portions of the members 22 and 23. The part 25 is arranged to receive and have attached thereto in any suitable manner the angular ring 27 to which is secured the tire tread 28.

The bowed ends 20 of the plates 13 are each suitably apertured as indicated at 29, and the two parts of the housings 22 and 23 are likewise apertured, as indicated at 30. These apertures in the housing plates 22 and 23 and in the bowed ends of the spring plates 13 are aligned to receive bolts, such as 31, fitted with corporating nuts 32. These bolts 31 serve to place the bowed ends 20 of the annular spring plates 13 in compression when the nuts 32 are drawn up. In this action the two-part housing, consisting of the plates 22 and 23, will slide toward one another on the parts 24 and 25, thereby bringing together the ends 20 of the spring plates 13, this action tending to compress the springs against their natural tendency to spring outwardly, due to the bow formation thereof.

In assembling a wheel of this character the steel plates 10 and 11 comprise what may be termed the hub of the wheel and in this hub are placed the desired number of annular spring plates 13, having fitted therebetween the wooden separating member 14. When this annular plate 13 and the wooden separator are assembled in proper position, so that the apertures in the straight portion 17 of the plates align with the apertures of the wooden separator 14, a plurality of bolts such as 15 are forced through these apertures and secured in place by the nuts 16. This secures the plurality of annular plates and the wooden separator to the flanges 10 and 11 or hub of the wheel. The bolts 18 are next forced through the apertures in the lower straight portion 17 of the annular spring plates 13, thereby firmly securing the lower end of these spring plates to the wooden separator 14 and rigidly assembling the annular spring plates and the separator in position. The two plates 22 and 23 of the housing are next fitted over the bowed ends 20 of the spring plates 13 and the bolts 31 are then forced through the aligned apertures 30 in the housing plates 22 and 23, and the apertures 29 in the bowed ends 20 of the annular spring plates 13.

The plate 27 which carries the wheel tread 28 may be secured to the housing plate 23 either before assembly or after the plate 23 is placed in position as hereinbefore described. Preferably, this plate is secured to the plate 23 after the wheel is assembled. The tread 28 may be secured to the plate 27 in any of the well known methods known in the art.

The apertures 29 in the bowed ends 20 of the spring plates 13 are made sufficiently large so as to give ample clearance to the bolt 31 to permit movement of these forwardly extending bowed ends 20 of the spring plates 13 on the inner surface of the housing plates 22 and 23. To facilitate this movement, the bowed ends 20 are preferably lubricated, as is also the inner surface of the housing plates 22 and 23.

It will now be evident from the foregoing description that when a wheel of the character described rides over an obstruction or bump in the road that the shocks or vibrations, due to said obstruction or bump, will be communicated through the tread 28 to the housing comprising the annular plates 22 and 23. The shock or vibration communicated to these plates will then be absorbed by movement between the bowed ends 20 of the annular springs 13 and the housing plates 22 and 23, the bowed ends of the spring next adjacent, the inner surface of the housing plates 22 and 23 sliding on this inner surface. If more than one spring plate 13 is used on either side of the block 14 the bowed ends of these other spring plates will slide with the spring plate adjacent the inner surface of the housing plates 22 and 23, and there will also be a slight movement between the adjacent surfaces of the contacting bowed ends 20 of all of the spring plates.

As hereinbefore stated, the bowed ends 20 of the spring plates 13 are placed in compression by the drawing up of the nuts 32 which cooperate with the bolts 31. Consequently, the amount of this compression to which the bowed ends 20 of the forwardly extending ends of the annular springs 13 is subjected can be readily regulated and adjusted.

As indicated in Fig. 2, when the tread 28 of the wheel strikes an obstruction in the road, the tread and its associated housing will be moved on the bowed ends 20 of the annular plate springs 13. The relative movement between the housing plates 22 and 23 and the bowed ends 20 of the springs is exactly opposite at the point diametrically opposed in the circumference of the wheel to the point of contact. The extent and relation of this movement between these parts will gradually change from the movement at the point of contact around the circumference of the wheel until the opposite movement is attained at a point diametrically opposed in the circumference of the wheel to the point of contact. The movement of the housing plates 22 and 23, with respect to the bowed ends 20 of the annular spring plates 13, is clearly indicated in broken lines in Fig. 2, which show the position assumed by the housing and the annular spring plates when said housing is displaced, due to contact with road obstructions.

It will be evident, due to the bowed construction of the ends 20 of the spring plates 13, that when the housing plates 22 and 23 are displaced from the normal position assumed when the wheel is at rest supporting the weight of the car; that is, when these housing plates 22 and 23 have been given a relative movement with respect to the bowed ends 20 of the annular plates 13; that the bowed ends of these plates will be put under greater compression. Likewise, the additional compression to which the bowed ends of these plates will be subject can be readily regulated by the contour of the inner surface of the housing plates 22 and 23 and the bowed ends 20 of the annular plates 13. The contour of the inner surface of the housing plates and the bowed ends of the annular spring plates, therefore, will regulate, more or less, the manner and ease with which shocks and vibrations are absorbed by the wheel.

Reference will now be made to Figs. 3 and 4 in which a modified construction is illustrated comprising similar steel flange plates 40 and 41, to which are secured, by means of the bolts 42, the spokes such as 43. These spokes carry the wooden felloe 44 to which is secured in any suitable manner, preferably by bolts such as 45 and their cooperating nuts 46, the felloe band 47. This felloe band carries on either side thereof either one or a plurality of annular spring plates 48 having the forwardly extending bowed ends 49. The straight portions 50 of these annular spring plates 48 are secured to the felloe band 47 by means of a plurality of bolts such as 51 having cooperating nuts 52. The bowed ends 49 of the plates 48 are fitted in a housing comprising the annular enclosing plates 53 and 54, similar to those described in connection with Figs. 1 and 2, the plates being fitted with a suitable annular tread securing plate 55 and a tread 56.

The bowed ends 49 of the annular spring plates 48 are apertured at 58, and the housing plates 53 and 54 are apertured at 59 and 60 respectively to receive bolts such as 61 fitted with cooperating nuts 62. These bolts 61 and their cooperating nuts 62 function together with the housing plates 53 and 54 to place the bowed ends 49 of the springs under compression as hereinbefore described in connection with the embodiment illustrated in Figs. 1 and 2. The general functioning of the parts in the absorption of shocks and vibrations transmitted to the tread of the wheel, due to irregularities in the road, is the same as described in connection with the embodiment illustrated in Figs. 1 and 2.

Fig. 5 shows another embodiment of the invention in which the spokes 63 are secured to a felloe 64 to which is fastened a felloe band 65 by means of bolts such as 66 and their cooperating nuts 67. In this embodiment, the annular spring absorbing plates are circular in shape, as indicated at 70, and are secured to a spring retainer 65' which in turn is secured to a felloe band 65 by the bolts 66 and their cooperating nuts 67. The spring retainer 65' is circular in shape and is opened at some point in its circumference so that it may be readily sprung onto the circular plates 70. The annular plates 70 extend, as clearly illustrated in Fig. 5, from the annular housing enclosing plate 71 up under the spring retainer 65' to the other annular housing enclosing plate 72.

The circular plates are placed in compression by means of bolts such as 73 and their cooperating nuts 74 in a manner similar to that hereinbefore described in connection with the other embodiments. Likewise, the action of the construction shown in Fig. 5 in absorbing shocks and vibrations is similar to that described hereinbefore and, consequently, it is deemed unnecessary to specifically describe this action in connection with the construction shown in this figure.

From the detailed description of the illustrations hereinbefore given, it will now follow that the construction of the wheel is such that shocks and vibrations will be very readily absorbed in the tire, irrespective of the angle at which the shock or vibration is administered to the wheel tread, due to obstructions in the path of the tread.

Likewise, it will follow that inasmuch as the shocks and vibrations are absorbed by the interaction of the tread carrying housing and the bowed ends of the annular spring plates that the rubber tread which is secured to the outer periphery of the housing can be very lightly constructed since it does not serve to absorb shocks or vibrations, but acts merely as a cushion to eliminate noise. The vibrations and shocks would be readily absorbed by the construction shown, if no rubber or other resilient tire tread were secured to the outer periphery of the housing, but this would result in a construction which would be extremely noisy, due to the rattling of the metallic housing over the road. Consequently it is advisable to fit the outer periphery of the housing with some suitable cushioning member, such as a rubber tread.

It will be evident, also, that with wheels constructed in accordance with the teachings of this invention, a construction is obtained which will give the same and possibly more resilience than the ordinary pneumatic tires or solid tires which are now being produced commercially, and that this resilience is obtained with a construction which eliminates all the troubles incident to the wear and injuries now prevalent in the commercial forms of rubber and pneumatic tires generally used.

Obviously the invention is not limited to the specific embodiment thereof herein illustrated and described, but is capable of other variations and many applications within its spirit and scope, as pointed out in the following claims.

Having thus described my invention, what I claim is new and desire to secure by Letters Patent is:

1. A cushion wheel comprising in combination, a wheel supporting member, a resilient shock and vibration absorbing means secured to said member, a housing enclosing the ends of said resilient means and slidably fitted thereon, means to maintain said vibration absorbing means and housing under initial compression whereby said housing will slide on the enclosed portions of said resilient means in absorbing shocks and vibrations.

2. A cushion wheel comprising in combination, a wheel supporting hub, an annular resilient shock and vibration absorbing plate secured to either side of said hub, the outer ends of said plates being bowed outwardly, and a housing clamped to the said bowed ends to place said ends in compression, the plates being slidably fitted in said housing, whereby shocks and vibrations are taken up by movement between said plate and housing.

3. A cushion wheel comprising in combination, a wheel supporting member, resilient members secured to said support having bowed outer ends, means for maintaining said bowed outer ends under compression, and a wheel tread secured to said last mentioned means.

4. A cushion wheel comprising in combination, a wheel supporting member, annular resilient members secured to said support having bowed outer ends, means for maintaining said bowed outer ends under compression, and a wheel tread secured to said last mentioned means.

5. A cushion wheel comprising in combination, a wheel supporting hub, a metallic annular resilient member secured to either side of said hub, said annular member having bowed outer ends, a housing slidably fitted on the outer bowed ends, said housing maintaining said bowed ends in compression, and a wheel tread secured to said housing.

6. A cushion wheel comprising in combination, a wheel supporting member, resilient annular members secured to said member, a housing for the outer ends of said resilient members slidably fitted on said members and holding said ends in compression, whereby said housing may be moved on the outer ends of said resilient members to absorb vibrations and shocks transmitted to said housing.

7. A cushion wheel comprising in combination, a wheel supporting hub, a resilient annular steel plate secured to either side of said hub, means to maintain the plates secured to either side of said hub in a separated position, said plates having outer bowed ends, a housing for said outer bowed ends slidably mounted on said bowed ends, whereby shocks and vibrations transmitted to the housing will be absorbed by movement between said housing and the outer bowed ends of said steel plates.

8. A cushion wheel comprising in combination a wheel supporting member, an annular resilient metallic plate secured to either side of the supporting member, means to maintain said plates in a separated position, the said plates being fitted with outer bowed ends, a two-part housing enclosing the outer bowed ends of said plates and means for placing the bowed ends of said plates in compression with said housing.

9. A cushion wheel comprising in combination, a wheel supporting member, a resilient annular metallic plate secured to either side of said member, means for maintaining said plates in a separated position, said plates having outer bowed ends, a two-part housing enclosing said outer ends and slidably mounted thereon, and means for placing the outer bowed ends of said plates in compression in said housing.

10. A cushion wheel comprising in combination, a wheel supporting member, a resilient annular metallic plate secured to either side of said member, means for maintaining said plates in a separated position, said plates having outer bowed ends, a two-part housing enclosing said outer ends and slidably mounted thereon, means for placing the outer bowed ends of said plates in compression in said housing, and said last mentioned means being adjustable to determine the amount of said compression.

11. A cushion wheel comprising in combination, a wheel supporting hub, a plurality of annular leaf spring plates secured to either side of said hub, means for maintaining the plurality of plates secured to either side of said hub separated, said plates having outer bowed ends, a two-part housing enclosing the outer ends of said plates and slidably mounted on said plates, aligned apertures in said plates and said housing, means fitted in said aligned apertures and adapted to place the outer ends of said plates under compression.

12. A cushion wheel comprising in combination, a wheel supporting hub, a plurality of annular leaf spring plates secured to either side of said hub, means for maintaining the plurality of plates secured to either side of said hub separated, said plates having outer bowed ends, a two-part housing enclosing the outer ends of said plates and slidably mounted on said plates, aligned apertures in said plates and said housing, bolts passing through said apertures adapted to place the outer ends of said plates under compression, and a wheel tread secured to the outer periphery of said housing.

13. In a device of the character described in combination, a wheel supporting hub, resilient annular metallic plates secured to either side of said hub, a separating means positioned between the plates secured to either side of said hub, the outer ends of said plates being bowed in opposite directions, a two-part housing fitted about the bowed ends of said outer plates, apertures in the outer ends of said plates and said housing, bolts extending through said apertures for securing said housing and the outer bowed ends of said plates in assembled and slidable relationship, the said bolts serving to place the outer ends of said plates in compression in said housing, whereby movement of said housing due to shock and vibration will be absorbed by relative movement between said housing and the outer ends of said plates.

14. In a device of the character described, a wheel supporting member, annular spring shock and vibration absorbing plates secured to said supporting member, said plates being bowed in opposite directions and depending from said supporting members, enclosing means for the bowed portions in which said springs are slidably mounted, and means for placing said springs in compression in said enclosing member, whereby movement between said enclosing member and said depending plates will absorb shocks and vibrations.

In witness whereof, I have hereunto subscribed my name.

ADDISON C. HOOF.